United States Patent [19]

Gunnell et al.

[11] Patent Number: 5,331,097

[45] Date of Patent: *Jul. 19, 1994

[54] POLY(OXYALKYLENE) SUBSTITUTED XANTHENE COLORANT AND METHOD FOR MAKING THE SAME

[75] Inventors: Timothy B. Gunnell, Moore; John B. Hines, Jr.; Carey N. Barry, Jr., both of Spartanburg, all of S.C.

[73] Assignee: Milliken Research Corporation, Spartanburg, S.C.

[*] Notice: The portion of the term of this patent subsequent to Oct. 5, 2010 has been disclaimed.

[21] Appl. No.: 744,342

[22] Filed: Aug. 13, 1991

[51] Int. Cl.$^5$ .......................................... C07D 311/88
[52] U.S. Cl. .................................... 549/226; 549/227
[58] Field of Search ............................. 549/226, 227

[56] References Cited

U.S. PATENT DOCUMENTS

| | | | |
|---|---|---|---|
| 3,157,633 | 11/1964 | Kuhn | 260/200 |
| 3,769,302 | 10/1973 | Hoover et al. | 260/335 |
| 3,873,573 | 3/1975 | Farber et al. | 260/343.4 |
| 4,144,028 | 3/1979 | Hauser et al. | 8/164 |
| 4,156,682 | 5/1979 | Hotta et al. | 549/226 |
| 4,167,510 | 9/1979 | Brendle | 260/174 |
| 4,302,393 | 11/1981 | Garner et al. | 549/226 |
| 4,330,473 | 5/1982 | Hatano et al. | 549/226 |
| 4,557,862 | 12/1985 | Mangel et al. | 549/227 |
| 4,603,202 | 7/1986 | Mayer et al. | 549/226 |
| 4,694,088 | 9/1987 | Kaneko et al. | 549/226 |
| 4,749,796 | 6/1988 | Sensui et al. | 549/227 |
| 4,806,657 | 2/1989 | Zink | 549/226 |
| 4,895,961 | 1/1990 | Schmeidl | 549/227 |
| 4,935,059 | 6/1990 | Mayer et al. | 549/226 |
| 4,945,176 | 7/1990 | Hammond et al. | 549/227 |
| 4,977,278 | 12/1990 | Schmeidl | 549/227 |

FOREIGN PATENT DOCUMENTS

| | | | |
|---|---|---|---|
| 35688 | 9/1977 | Japan | 549/226 |
| 8096588 | 6/1983 | Japan | 549/226 |
| 9120654 | 7/1984 | Japan | 549/226 |
| 9157153 | 9/1984 | Japan | 549/226 |

OTHER PUBLICATIONS

Color Index, 3rd Ed., vol. 4, pp. 4419-4422 (1971).
Venkataraman, *The Chemistry of Synthetic Dyes*, vol. 2, pp. 750-754 (1952).

*Primary Examiner*—Cecilia Tsang
*Attorney, Agent, or Firm*—Timothy J. Monahan; Terry T. Moyer

[57] ABSTRACT

A diamino-xanthene colorant is provided having the following structure:

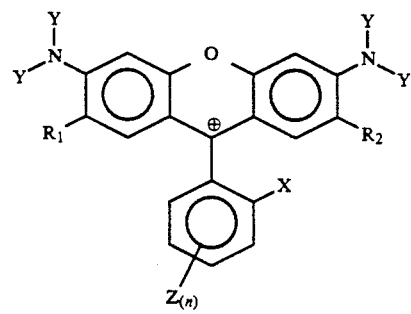

where Y is a poly(oxyalkylene) substituent having a straight or branched polymer chain of at least 3 monomer units selected from ethylene oxide, propylene oxide, butylene oxide and glycidol;

$R_1$ and $R_2$ are independently selected from H, C1–C4 alkyl, C1–C4 alkoxy, Cl, Br and I;

X is selected from H, $SO_3-$, $CO_2-$ and $COOR_3$, where $R_3$ is C1–C4 alkyl or aryl; and each Z is independently selected from $SO_3-$, $CO_2-$, $COOR_4$, Cl and OH, where $R_4$ is C1–C4 alkyl or aryl, and n is 0, 1, or 2; the colorant is synthesized by condensing two moles of an N,N-bis(poly(oxyalkylene))-p-methoxyaniline and o-formylbenzene sulfonic acid.

29 Claims, No Drawings

POLY(OXYALKYLENE) SUBSTITUTED XANTHENE COLORANT AND METHOD FOR MAKING THE SAME

BACKGROUND OF THE INVENTION

This invention relates to a novel poly(oxyalkylene) substituted xanthene colorant, and particularly, to a triphenylmethane derivative exhibiting improved water solubility and fugitivity. The method for making the xanthene colorant involves a condensation reaction of a N,N-bis(poly(oxyalkylene))-m-alkoxyaniline intermediate.

Xanthene dyes, and in particular 3-,6-diamino-xanthenes such as rhodamine dyes, are well known in the art as exemplified in the COLOR INDEX, 3rd. ed., Vol. 4., pp. 4419–4422 (1971). These dyes range from bright red to bright bluish red, and typically fluoresce orange or red upon exposure to ultraviolet light. Rhodamine dyes have found use in a variety of applications including coloring soaps and other cleaning products, water tracing and leak detection. While the dyes have gained wide acceptance throughout the industry, they have come under suspicion as being toxic and unsuitable for use when human exposure to the dye is expected. Less toxic rhodamines have been commercialized, such as Rhodamine WT. However, Rhodamine WT has relatively poor light fastness, and tends to stain skin, clothes and equipment.

Another category of triphenylmethane type xanthene dyes is exemplified by the compounds disclosed in Farber et al., U.S. Pat. No. 3,873,573; Hatano et al., U.S. Pat. No. 4,330,473; and Zink, U.S. Pat. No. 4,806,657. These diamino-xanthene dyes have amino groups in the 3- and 7- positions. In particular, the amino group in the 7- position may be phenyl substituted. The patents also disclose N-phenyl-p-methoxylaniline intermediates which may be reacted with a ketonic acid. These compounds are particularly useful as recording material, since opening the lactone ring of such compounds converts the faintly colored material to a dark green or black color.

Methods of improving the water solubility or fugitivity of dyes by providing one or more poly(oxyalkylene) substituents is known in the art. Examples of "fugitive tints" are disclosed in Kuhn, U.S. Pat. No. 3,157,633; Hauser et al., U.S. Pat. No. 4,144,028; and Brendle, U.S. Pat. No. 4,167,510. The aforementioned colorants have been found to be especially useful in the textile industry for identification of fibers and yarn during weaving or tufting. The colorants are easily removed to allow the textile product to be dyed a uniform color in subsequent stages of the manufacturing process.

A large number of organic dyes have been synthesized with intermediates provided with poly(oxyalkylene) substituents and include azo, methine, anthraquinone and some triphenylmethane colorants. Nevertheless, attempts to synthesize poly(oxyalkylene) substituted xanthene dyes have not heretofore met with success.

Typical prior art processes for manufacturing rhodamine type dyes provide for condensing m-dialkylaminophenol with phthalic anhydride. A diagram of the synthesis of Rhodamine B, described in Venkataraman, THE CHEMISTRY OF SYNTHETIC DYES, Vol. II, pp. 750–54 (1952), is set forth below.

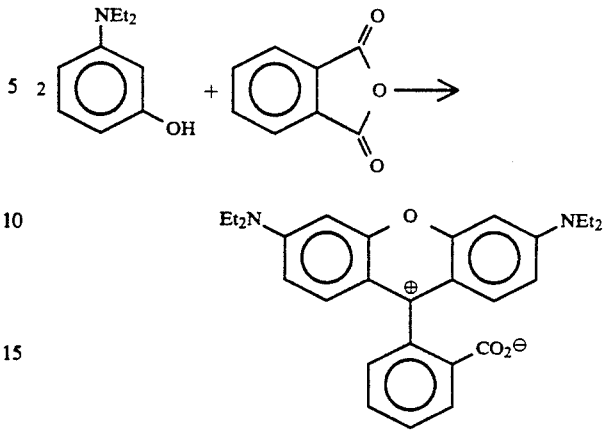

The final step of the condensation reaction is believed to be a ring closure involving the hydroxyl groups on the m-dialkylaminophenol residues, which together with the phthalic anhydride residue form a triphenylmethane compound. The exact mechanism is not known, however, an ether linkage is formed between the phenyl groups at the former site of the hydroxyl substituents to complete the ring.

In synthesizing a poly(oxyalkylene) substituted colorant, it is desirable to alkoxylate one or more of the reactants or intermediates which form the colorant. However, the intermediates used in a typical rhodamine synthesis may not be readily alkoxylated without adding poly(oxyalkylene) to sites on the intermediate which participate in colorant formation. Thus, despite a strong desire to provide a poly(oxyalkylene) substituted rhodamine colorant or other poly(oxyalkylene) substituted triphenylmethane type xanthene colorants to the market, such a product has not been available.

SUMMARY OF THE INVENTION

Therefore, one of the objects of the invention is to provide a poly(oxyalkylene) substituted xanthene colorant.

Another object of this invention is to provide a synthesis route for a xanthene colorant wherein at least one of the reactants or intermediates may be substituted with a poly(oxyalkylene) group.

Still another object of the invention is to provide a poly(oxyalkylene) substituted intermediate which can participate in formation of a diphenyl ether linkage in a ring closure step of a 3,6-diamino xanthene colorant synthesis.

Yet another object of the invention is to provide an N-poly(oxyalkylene) substituted aniline intermediate which may react to form a rhodamine type colorant.

Accordingly, a rhodamine type, xanthene colorant is synthesized from an N-poly(oxyalkylene)-m-alkoxyaniline or N,N-bis(poly(oxyalkylene))-m-alkoxyaniline intermediate. The alkoxy group, preferably C1-C4 alkoxy, is resistant to substitution by the monomer units which constitute the poly(oxyalkylene) chain and react with the amino group of the intermediate. The colorant has at least one, and preferably two, poly(oxyalkylene) substituents characterized as having a straight or branched polymer chain of at least 3 monomer units selected from ethylene oxide, propylene oxide, butylene oxide and glycidol.

In one embodiment, two moles of N,N-bis(poly(oxyalkylene))-m-alkoxyaniline are reacted with benzaldehyde or derivatives thereof. The resulting rhodamine type colorant is provided with up to four poly(oxyalkylene) substituents, two on each amino group of the colorant. It should be noted that when benzaldehyde or derivatives thereof are used, an oxidation step is required to produce the colorant.

In an alternate embodiment of the invention, a non-polymeric intermediate, such as mono- or di-, alkyl or aryl substituted m-aminophenol, is provided in place of one of the polymeric intermediates. The non-polymeric intermediate, for example N,N-diethyl-m-aminophenol, may be first reacted with phthalic anhydride according to the procedure disclosed in Hoover, et al., U.S. Pat. No. 3,769,302, Example A. Next, a polymeric intermediate, N,N-bis(poly(oxyalkylene))-m-alkoxyaniline, is reacted with the adduct of step one to make a colorant. The resulting colorant would have only one amino group substituted with poly(oxyalkylene).

It is envisioned that the aforementioned reactants may be provided with various substituents, in addition to poly(oxyalkylene), without deviating from the scope of the invention.

The novel poly(oxyalkylene) substituted xanthene colorants feature very good water solubility and fugitivity, and are believed to be relatively non-toxic. The colorants of the present invention also feature improved light-fastness relative to Rhodamine WT, a prior art rhodamine dye employed in part because of its low toxicity compared to other rhodamine dyes.

The invention also features a method of synthesizing a poly(oxyalkylene) substituted colorant from N,N-bis(poly(oxyalkylene))-m-alkoxyaniline rather than a m-aminophenol derivative.

DESCRIPTION OF THE PREFERRED EMBODIMENT OF THE INVENTION

Without limiting the scope of the invention, the preferred features of the invention are hereinafter set forth.

The xanthene colorant of the present invention is a product of a condensation reaction incorporating at least one mole of a polymeric intermediate characterized by the formula:

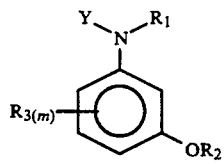

where Y is a poly(oxyalkylene) substituent having a straight or branched polymer chain of at least 3 monomer units selected from ethylene oxide, propylene oxide, butylene oxide and glycidol;
where $R_1$ is selected from C1-C20 alkyl, aryl and Y; $R_2$ is C1-C4 alkyl;
each $R_3$ is independently selected from H, C1-C4 alkyl, C1-C4 alkoxy, Cl, Br and I, and m is 0, 1 or 2.
Preferably, $R_1$ is Y, $R_2$ is methyl or ethyl, and $R_3$ is C1-C4 alkyl, and m is 0 or 1. More preferably, $R_2$ is methyl and $R_3$ is methyl or ethyl and positioned para to the alkoxy group.

The above intermediate may be synthesized by alkoxylating m-anisidine using standard techniques. Monomer units selected from glycidol, ethylene oxide, propylene oxide and butylene oxide are employed as reactants. In a preferred embodiment, each of said poly(oxyalkylene) substituents is comprised of from 3 to 375 of such monomer units, more preferably from 3 to 200. Additionally, water solubility and fugitivity is enhanced by providing that at least 75% of the monomer units be ethylene oxide. Monomer units selected from ethylene oxide, propylene oxide and glycidol are preferred both from considerations of cost and performance.

Another consideration for improved performance of the rhodamine colorant is the branching of the poly(oxyalkylene) substituent. Glycidol may be incorporated into the polymer to provide multiple hydroxyl sites for chain growth. It is believed that adding glycidol first to the amino group optimizes branching. In a preferred embodiment, at least one mole of glycidol is reacted into the poly(oxyalkylene) chain followed by at least four moles of ethylene oxide. For efficient use of raw materials, the glycidol is reacted with the amino group of m-anisidine.

More uniform branching of the poly(oxyalkylene) substituent may be achieved by reacting a "secondary hydroxyl" forming epoxide, such as propylene oxide, with the glycidol, followed by addition of ethylene oxide. Thus, in a preferred embodiment, the poly(oxyalkylene) substituent is the product of reacting at least one mole of glycidol, followed by at least one mole of propylene oxide and then at least four moles of ethylene oxide. For example, beneficial results with regard to both reactivity of the intermediate and fugitivity have been achieved with a ratio of glycidol/propylene oxide/ethylene oxide of 2/2/10 respectively.

A glycidol equivalent may be provided by reacting chloropropanediol with the amino group of m-anisidine. Two moles of chloropropanediol may be reacted with the amine group without substantial difficulty. If additional branched alkylene oxide units are desired, glycidol can be added to the poly(oxyalkylene) chain.

The terminal group on each poly(oxyalkylene) chain is not chemically bound in the xanthene colorant and is not believed to participate in or facilitate formation of the colorant compound. Therefore, the precise identity of the terminal group is not deemed to be critical to the invention, so long as the terminal group does not interfere with the synthesis. However, by way of example and not limitation, the following terminal groups may be employed:

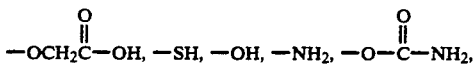

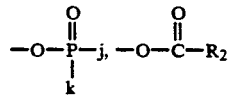

and sulfonates and sulfates of each of the members of said group, wherein $R_2$ is H, an alkyl radical containing up to about 20 carbon atoms or carboxy-terminated alkyl radical containing up to about 20 carbon atoms, j and k are OH, OM or $OR_3$ wherein M is a cation moiety of an alkali metal, an alkaline earth metal, transition metal, e.g., nickel, etc. or ammonium, and $R_3$ is an alkyl radical containing up to about 20 carbon atoms.

The following examples illustrate preparation of N,N-bis(poly(oxyalkylene))-aniline from m-anisidine. Unless otherwise stated, parts and percentages are by weight. The abbreviations EO, PO, and Gly refer to —CH$_2$CH$_2$O—, —CH$_2$CHO(CH$_3$)—, and glycidol respectively. The number of oxyalkylene groups shown per molecule of colorant represents an average.

EXAMPLE 1

The Synthesis of N,N-bis(hydroxyethylpolyoxyethylene, polyoxypropylene, polyglycidol)-m-anisidine

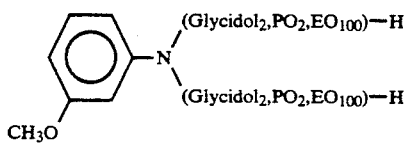

One hundred twenty-three grams of m-anisidine was treated with a basic catalyst and heated to 120° C. Two hundred ninety-six grams of glycidol was added dropwise to the heated m-anisidine. The product of this reaction was moved to an ethoxylation reactor and was treated with 4 g KOH. Two hundred twenty-four grams of propylene oxide followed by 8800 g ethylene oxide was then added to the reactor in the usual fashion. The product is then vacuum stripped and bottled. A final hydroxy number of 38.6 was obtained which compares to a theoretical hydroxy number of 35.6.

EXAMPLE 2

Synthesis of N,N-bis(hydroxyethylpolyoxyethylene, polyoxypropylene)-m-anisidine:

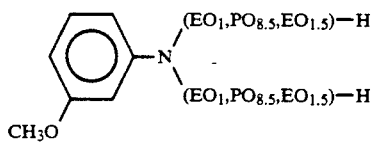

Three hundred fifty grams of m-anisidine were treated with 4 grams of KOH and heated to 250° C. in an ethoxylation reactor. Two hundred fifty grams of ethylene oxide (EO) were added in the usual fashion. Following EO addition, twenty-four hundred seventy-two grams of propylene oxide were added. Finally, four hundred twelve grams of ethylene oxide were added. The product was then vacuum stripped and bottled. A final hydroxy number of 76.5 was obtained.

In order to provide a colorant with optimum water solubility and fugitivity, two moles of the poly(oxyalkylene) substituted intermediate are provided per colorant molecule. However, as noted above, the rhodamine type colorant of the present invention may be synthesized with only one mole of poly(oxyalkylene) substituted intermediate using, for example, the procedures in U.S. Pat. No. 3,769,302.

A variety of m-aminophenols, such as N-alkyl-m-aminophenol, N,N-dialkyl-m-aminophenol and N-aryl-m-aminophenol may be employed as the non-polymeric reactant to form the colorant. By way of further example, the amino group of the non-polymeric intermediate may be mono- or di- substituted with C1-C20 alkyl or aryl, preferably, C1-C8 alkyl or aryl.

While phthalic anhydride is a common reactant for rhodamine synthesis, there are a variety of compounds which can be employed in the present invention in its place, particularly benzaldehyde. Additionally, by way of example and not limitation, the following compounds may be substituted for phthalic anhydride or benzaldehyde, referred to generally herein as phthalic anhydride or benzaldehyde derivatives, in the synthesis of rhodamine colorants:

o-formylbenzenesulfonic acid;
4-formyl-1,3-benzenedisulfonic acid;
o-formylbenzoic acid;
o-formyl alkylbenzoates;
mono, di and tri-halobenzaldehydes with Cl, Br and I; Cl preferred, such as o-chlorobenzaldehyde;
mono, di, tri and tetra-halophthalic anhydride with Cl, Br and I; and
trimellitic acid; and
5-hydroxytrimellitic acid.

If a benzaldehyde or benzaldehyde derivative is employed in the synthesis of a colorant, a second oxidation step is performed to oxidize the triphenyl substituted carbon. Suitable oxidizing agents include persulfate, dichromate, peroxides and benzoquinones.

Benzaldehyde, or a derivative thereof, is used as a reactant when residues of two moles of N,N-bis(-poly(oxyalkylene)-m-alkoxyaniline form the colorant. Examples of rhodamine type colorants having four poly(oxyalkylene) substituents, made by reacting two moles of a polymeric intermediate with o-formylbenzene sulfonic acid, are set forth below. In addition to o-formylbenzene sulfonic acid, 4-formyl-1,3-benzenedisulfonic acid is preferred.

EXAMPLE 3

Synthesis of Polymeric Fluorescent Red Containing 8 Glycidol, 8 PO, and 40 EO Monomers

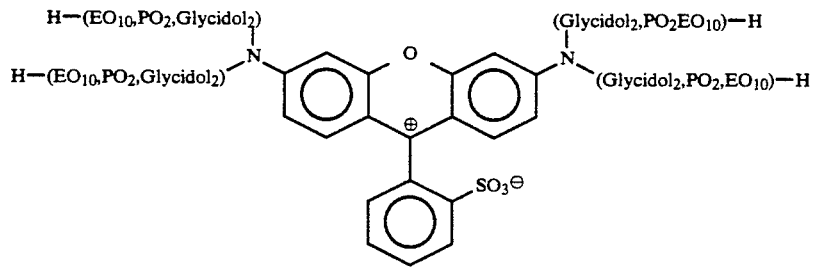

810.6 grams of an N,N-bis(hydroxyethylpolyoxyethylene, polyoxypropylene, polyglycidol)-m-anisidine synthesized according to the procedure of Example 1, containing 4 glycidol, 4 PO and 20 EO monomers, was charged to a 1-L, 4-necked round-bottomed flask along with 143 ml of water. The mixture was heated until a clear solution was obtained; then 57.9 g of o-formylbenzene sulfonic acid and 25.1 g of urea were added to the solution. The reaction mixture was heated to 62°

C. and the pH was adjusted to 1.5–2.0 with HCl. The reaction was further heated to 95° C. and held there for 30 min. The reaction was then allowed to cool to 85° C. and 48.1 g Benzoquinone was added. The reaction was heated to 95° C. and held there for 30 min. The water was stripped from the reaction which was then allowed to heat to between 150° C. and 200° C. for 40 minutes. The reaction was neutralized with caustic. 2700 ml of water was then charged to obtain a fluorescent red solution with an absorptivity of 1.0 at 557 nm.

EXAMPLE 4

Synthesis of Polymeric Fluorescent Red Containing 8 Glycidol, 8 PO, and 386 EO Monomers

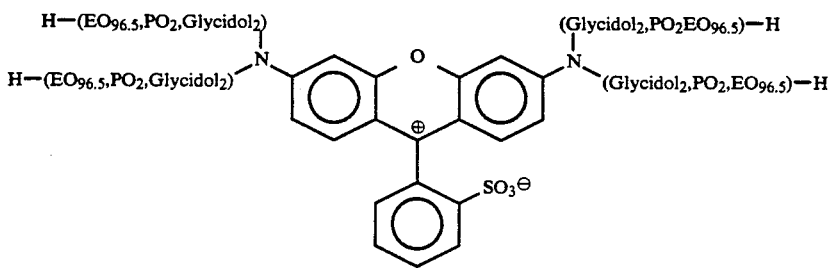

Ninety-one grams of an N,N-bis(hydroxyethyl-polyoxyethylene, polyoxypropylene, polyglycidol)-m-anisidine synthesized according to the procedure of Example 1, containing 4 glycidol, 4 PO and 193 EO monomers was charged to a 1-L, 4-necked round-bottomed flask along with 61 ml of water. The mixture was heated until a clear solution was obtained, then 1.1 g of o-formylbenzene sulfonic acid and 0.3 g of urea were added to the solution. The reaction mixture was heated to 62° C. and the pH was adjusted to 1.6 with HCl. The reaction was further heated to 95° C. and held there for 30 min. The reaction was then allowed to cool to 85° C. and 0.54 g Benzoquinone was added. The reaction was heated to 150° C. and then cooled back to 110° C. The water was stripped from the reaction which was then allowed to heat to 220° C. for 25 minutes. A fluorescent red polymeric colorant with an absorptivity of 1.04 at 557 nm was obtained.

The following example illustrates the synthesis of a diaminorhodamine type colorant having only one of the amino groups substituted with poly(oxyalkylene).

EXAMPLE 5

Synthesis of Polymeric Fluorescent Red Containing 2 EO, 17 PO and 3 EO Monomers

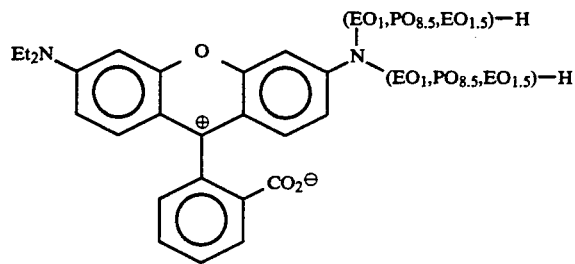

To a 1-L 3-necked flask was charged 108.64 g of m-anisidine 2EO/17PO/3EO (the product of Example 2), 7.0 g of 98% sulfuric acid and 18.8 g of 2-(4-diethylamino-2-hydroxybenzoyl)-benzoic acid. The flask was flushed with nitrogen and heated to 180° C. for 1.5 hours. After cooling to ambient temperature, water (about 450 mL) was added and the mixture heated, with stirring, to about 80° C. The stirring was stopped allowing the mixture to separate into two layers. The upper, aqueous layer was decanted. This washing procedure was repeated twice. Residual water was removed by rotary evaporation affording a product with an absorptivity of 19.6 at 547 nm.

In general, the reaction to establish the diphenyl ether linkage or cyclization of the triphenylmethane intermediate formed during the reaction is performed at acid pH at temperatures above 100° C. The cyclization reaction is typically run at atmospheric conditions and any water in the reaction solution is evaporated. Preferably, the pH is adjusted to below 5 and more preferably to 2.5 to 3, by addition of HCl, although other acids may be employed. Temperatures above 150° C. are preferred, more preferably the temperature is maintained above 160° C., and especially between 170° C. and 200° C. Reaction time to complete the cyclization reaction decreases slightly with increased temperature. Good yields may be achieved with reaction times of 30 minutes at approximately 160° C. More conservatively, the cyclization reaction is run at between 170° C. to 200° C. for 40 minutes.

Thus, rhodamine colorants having the following general structure may be produced according to the teachings herein:

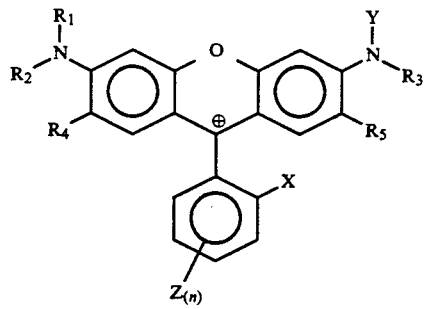

where Y is a poly(oxyalkylene) substituent having a straight or branched polymer chain of at least 3 monomer units selected from ethylene oxide, propylene oxide, butylene oxide and glycidol;

where $R_1$ and $R_2$ are independently selected from H, C1–C20 alkyl, aryl and Y, provided that if either $R_1$ or $R_2$ is Y, the other is not H;

$R_3$ is selected from C1–C20 alkyl, aryl and Y;

$R_4$ and $R_5$ are independently selected from H, C1–C4 alkyl, C1–C4 alkoxy, Cl, Br and I;

X is selected from H, $SO_3$—, $CO_2$—, $COOR_6$, Cl, Br and OH, and $R_6$ is C1–C8 alkyl or aryl; and each Z is independently selected from $SO_3-$, $CO_2-$, $COOR_7$, Cl, Br; and OH, and $R_7$ is C1-C8 alkyl or aryl, and n is 0, 1, 2, 3 or 4.

Preferably, $R_1$ and $R_2$ are selected from H, C1-C8 alkyl, aryl and Y, and more preferably, $R_1$, $R_2$ and $R_3$ are Y. Preferably, $R_4$ and $R_5$ are selected from H, methyl and ethyl, and more preferably from H and methyl. Preferably, X is selected from H, $SO_3-$, $CO_2-$ and $COOR_6$, where $R_6$ is C1-C4 alkyl or aryl; and each Z is independently selected from $SO_3-$, $CO_2-$, $COOR_7$, Cl and OH, where $R_7$ is C1-C4 alkyl or aryl, and n is 0, 1, or 2, more preferably, each Z is independently selected from $SO_3-$, $CO_2-$, and $COOR_7$, where $R_7$ is C1-C4 alkyl or aryl, most preferred is for n to be 0.

The following tests were performed to compare the performance of the poly(oxyalkylene) substituted colorants of the present invention with prior art rhodamine dyes.

EXAMPLE 6

Carpet Square Fugitivity Testing

A test was constructed which would simulate actual processing conditions that textile materials would encounter during heat setting, tufting, and continuous dying during the manufacturing of carpet. This test was used to determine the fugitivity or washability of various dyes and colorants (tints) when they were subjected to these conditions.

First, 4 inch by 4 inch undyed squares of nylon carpet were cut, and the level of color on them was determined using a Hunter Labscan Colorimeter. The samples were then sprayed with a tint solution such that around 0.5% by weight tint was applied to the carpet square. The samples were allowed to dry overnight and were then read on the colorimeter again. The samples were then heat set in an autoclave, read again on the colorimeter, and allowed to age for one week. They were then dipped in an acid solution for 30 seconds and vacuumed. They were dipped in a more acidic solution and allowed to drain. The samples were sprayed twice with water and vacuumed. They were then steamed and vacuumed a final time. The wet samples were dried in a convection oven and read one last time on a colorimeter. The results of this last color measurement were compared to the first. A five point scale was developed in which a score of 5.00 indicates that the tint was 100% fugitive, and the carpet square returned to its completely white shade. The results for a colorant of the current invention and Rhodamine WT, which has the same shade and fluorescence, are compared below in Table 1.

TABLE 1

| Tint | Score |
| --- | --- |
| Rhodamine WT | 0.02 |
| Example 4 | 1.24 |

EXAMPLE 7

Multi-fabric Fugitivity Testing

A test was constructed to test the fugitivity or washability on a variety of fabrics of colorants included in the present invention compared to rhodamine dyes, collectively referred to as tints. Thirteen fabric test strips which contain acetate, Self-Extinguishing Monoacrylic (SEF), Arnel, bleached cotton, Creslan 61, Dacron 54, Dacron 64, Nylon 6.6, Orlon 75, Spun Silk, polypropylene, viscose, wool were treated with dilutions of rhodamine dyes or colorants of the present invention. In each case the tint solution was diluted to the same absorptivity level. The fabric test strips were then allowed to dry and then they were rinsed in cold water. A number rating on a five point scale was given depending on how closely the fabric returned to its untreated color. The ratings were obtained using a Hunter Labscan Colorimeter. The ratings are shown in Table 2. A rating of 5 indicates complete fugitivity or washability, and a rating of 0 indicates complete staining.

TABLE 2

| FIBER | RHODAMINE WT | RHODAMINE B | EXAMPLE 3 | EXAMPLE 4 |
| --- | --- | --- | --- | --- |
| ACETATE | 2.54 | 4.55 | 4.66 | 4.80 |
| SEF | 0.10 | 3.32 | 2.59* | 4.16 |
| ARNEL | 2.03 | 4.04 | 4.61 | 4.75 |
| COTTON | 0.63 | 1.92 | 0.70* | 0.79 |
| CRESLAN 61 | 1.89 | 4.29 | 4.51 | 4.79 |
| DACRON 54 | 1.26 | 4.10 | 4.31 | 4.50 |
| DACRON 64 | 1.14 | 3.10 | 4.54 | 4.86 |
| NYLON 6.6 | 1.57 | 3.37 | 3.81 | 4.60 |
| ORLON 75 | 0.87 | 4.01 | 4.52 | 4.60 |
| SPUN SILK | 0.00 | 0.00 | 0.92 | 4.43 |
| POLYPROPYLENE | 0.78 | 3.04 | 4.41 | 4.75 |
| VISCOSE | 0.81 | 2.01 | 0.21* | 4.59 |
| WOOL | 0.00 | 0.00 | 1.77 | 3.88 |

The data shown above clearly demonstrates that the colorants of the current invention are more washable from the majority of fibers than either Rhodamine WT or Rhodamine B. Example 4 outperformed Rhodamine B on 12 of the 13 fabrics tested. Example 3 outperformed Rhodamine B on 11 of 13 fabrics. Rhodamine WT was the least washable of all the colors tested on all of the fabrics.

EXAMPLE 8

Lightfastness Testing

A test was constructed to compare a colorant of the current invention to Rhodamine WT for lightfastness. Rhodamine WT and Example 3 were diluted with water to same color strength then applied to polyester fabric. The fabric was allowed to dry and a color reading was then made with a Hunter Labscan Colorimeter. The fabric was then placed in a Xenon-arc Weatherometer, and the level of color was tested at 2, 8, 10, and 24 hours. A five point rating scale was used such that a rating of 5 indicates that there is no fading and a rating of 0 indicates complete fading. The results are listed in Table 3.

TABLE 3

| HOURS | RHODAMINE WT RATING | EXAMPLE 3 RATING |
|---|---|---|
| 2 Hours | 0.63 | 2.82 |
| 8 Hours | 0.20 | 2.23 |
| 10 Hours | 0.13 | 1.74 |
| 24 Hours | 0.07 | 0.15 |

The results above clearly demonstrate that the colorant of the current invention is more lightfast than Rhodamine WT in this test.

There are, of course, many alternate embodiments and modifications which are intended to be included within the scope of the following claims. For example, the colorant of the present invention may be incorporated into a thermoplastic resin as described in Baumgartner et al., U.S. Pat. No. 4,732,570 (incorporated by reference). Alternatively, embodiments of the colorant having reactive terminal groups may be reacted into a thermoplastic polymer as described in Cross et al., U.S. Pat. No. 4,284,729 (incorporated by reference).

What we claim is:

1. A xanthene colorant comprising a compound having the structure:

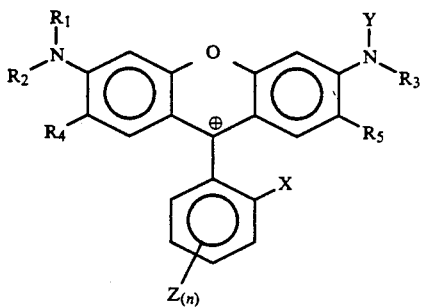

where Y is a poly(oxyalkylene) substituent having a straight or branched polymer chain of from 3 to 375 monomer units selected from ethylene oxide, propylene oxide, butylene oxide and glycidol;
where $R_1$ and $R_2$ are independently selected from H, C1–C20 alkyl, aryl and Y, provided that if either $R_1$ or $R_2$ is Y, the other is not H;
$R_3$ is selected from C1–C20 alkyl, aryl and Y;
$R_4$ and $R_5$ are independently selected from H, C1–C4 alkyl, C1–C4 alkoxy, Cl, Br and I;
X is selected from H, $SO_3$—, $CO_2$—, $COOR_6$, Cl, Br and OH, and $R_6$ is C1–C8 alkyl or aryl; and
each Z is independently selected from $SO_3$—, $CO_2$—, $COOR_7$, Cl, Br and OH, and $R_7$ is C1–C8 alkyl or aryl, and n is 0, 1, 2, 3 or 4.

2. The colorant of claim 1 wherein Y comprises from 3 to 200 of said monomer units.

3. The colorant of claim 2 wherein said monomer units are selected from ethylene oxide, propylene oxide and glycidol.

4. The colorant of claim 3 wherein Y is the product of reacting at least one glycidol monomer unit into said poly(oxyalkylene) chain followed by reacting at least four ethylene oxide monomer units into said poly(oxyalkylene) chain.

5. The colorant of claim 3, wherein Y is the product of first reacting at least one glycidol monomer unit into said poly(oxyalkylene) chain, followed by reacting at least one propylene oxide unit into said poly(oxyalkylene) chain, which is followed by reacting at least four ethylene oxide monomer units into said poly(oxyalkylene) chain.

6. The colorant of claim 2 wherein $R_1$ and $R_2$ are independently selected from H and C1–C8 alkyl, or are both Y; $R_3$ is Y; and n is 0, 1 or 2.

7. The colorant of claim 6 wherein Y is the product of reacting at least one glycidol monomer unit into said poly(oxyalkylene) chain followed by reacting at least four ethylene oxide monomer units into said poly(oxyalkylene) chain.

8. The colorant of claim 6 wherein $R_4$ and $R_5$ are independently selected from H, methyl and ethyl; X is selected from H, $SO_3$—, $CO_2$— and $COOR_6$, where $R_6$ is C1–C4 alkyl or aryl; and each Z is independently selected from $SO_3$—, $CO_2$—, and $COOR_7$, where $R_7$ is C1–C4 alkyl or aryl.

9. The colorant of claim 8 wherein Y is the product of reacting at least one glycidol monomer unit into said poly(oxyalkylene) chain followed by reacting at least four ethylene oxide monomer units into said poly(oxyalkylene) chain.

10. The colorant of claim 8 wherein Y is the product of first reacting at least one glycidol monomer unit into said poly(oxyalkylene) chain, followed by reacting at least one propylene oxide unit into said poly(oxyalkylene) chain, which is followed by reacting at least four ethylene oxide monomer units into said poly(oxyalkylene) chain.

11. A xanthene colorant comprising a compound having the structure:

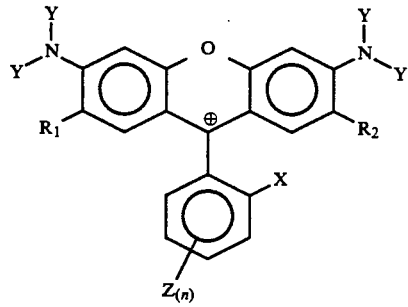

where Y is a poly(oxyalkylene) substituent having a straight or branched polymer chain of from 3 to 200 monomer units selected from ethylene oxide, propylene oxide, butylene oxide and glycidol;
$R_1$ and $R_2$ are independently selected from H, C1–C4 alkyl, C1–C4 alkoxy, Cl, Br and I;
X is selected from H, $SO_3$—, $CO_2$— and $COOR_3$, where $R_3$ is C1–C4 alkyl or aryl; and
each Z is independently selected from $SO_3$—, $CO_2$—, $COOR_4$, Cl and OH, where $R_4$ is C1–C4 alkyl or aryl, and n is 0, 1, or 2.

12. The colorant of claim 11 wherein said monomer units are selected from ethylene oxide, propylene oxide and glycidol.

13. The colorant of claim 12 wherein Y is the product of reacting at least one glycidol monomer unit into said poly(oxyalkylene) chain followed by reacting at least four ethylene oxide monomer units into said poly(oxyalkylene) chain.

14. The colorant of claim 12, wherein Y is the product of first reacting at least one glycidol monomer unit into said poly(oxyalkylene) chain, followed by reacting at least one propylene oxide unit into said poly(oxyalkylene) chain, which is followed by reacting at least four ethylene oxide monomer units into said poly(oxyalkylene) chain.

15. The colorant of claim 11 wherein $R_1$ and $R_2$ are independently selected from H and methyl.

16. The colorant of claim 15 wherein Y is the product of reacting at least one glycidol monomer unit into said poly(oxyalkylene) chain followed by reacting at least four ethylene oxide monomer units into said poly(oxyalkylene) chain.

17. The colorant of claim 11 wherein $R_1$ and $R_2$ are H, and n is 0.

18. The colorant of claim 17 wherein Y is the product of reacting at least one glycidol monomer unit into said poly(oxyalkylene) chain followed by reacting at least four ethylene oxide monomer units into said poly(oxyalkylene) chain.

19. The colorant of claim 17, wherein Y is the product of first reacting at least one glycidol monomer unit into said poly(oxyalkylene) chain, followed by reacting at least one propylene oxide units into said poly(oxyalkylene) chain, which is followed by reacting at least four ethylene oxide monomer units into said poly(oxyalkylene) chain.

20. A method of manufacturing a poly(oxyalkylene) substituted xanthene colorant comprising the steps of:
  (a) providing an aqueous solution of a triphenyl methane colorant, having
    (i) a first phenyl group substituted with an amino group in a position para to a central carbon, said amino group further having first and second substituents identified as Y, which are characterized by a straight or branched poly(oxyalkylene) chain of from 3 to 200 monomer units selected from ethylene oxide, propylene oxide, butylene oxide and glycidol; said first phenyl group is also substituted with an alkoxy group in a position ortho to said central carbon, wherein said alkoxy group has 1 to 4 carbon atoms, said first phenyl group is optionally methyl or ethyl substituted;
    (ii) said triphenyl methane colorant further having a second phenyl group substituted with an amino group in a position para to said central carbon, said amino group further having first and second substituents selected from H, C1–C20 alkyl, aryl and Y, provided that if one of said substituents is Y, the other cannot be H; said second phenyl group is also substituted with an hydroxyl or alkoxy group in a position ortho to said central carbon, wherein said alkoxy group has 1 to 4 carbon atoms, said second phenyl group is optionally methyl or ethyl substituted;
    (iii) said triphenyl methane further having a third phenyl group which is optionally substituted with up to three groups selected from $SO_3-$, $CO_2$ and COOR, where R is $C_{1-4}$ alkyl;
  (b) providing a pH of less than 7 is said solution; and
  (c) heating said solution to a temperature of 150° C. or greater, causing a ring closure reaction and formation of an ether linkage between said ortho positions on said first and second phenyl groups.

21. The method of claim 20 wherein the water in said solution is evaporated during said heating step.

22. The method of claim 21 wherein said alkoxy group of said first phenyl group is methoxy or ethoxy.

23. The method of claim 22 wherein said solution is adjusted to a pH of 5 or less and heated to a temperature of between 150° C. and 220° C. under atmospheric pressure.

24. The method of claim 23 wherein said alkoxy group of said first phenyl group is methoxy; said first and second substituents of said amino group of said second phenyl group are Y; and said hydroxyl or alkoxy substituent of said second phenyl group is methoxy.

25. The method of claim 20 wherein said solution is adjusted to a pH of 3 or less and heated to a temperature of between 150° C. and 220° C.

26. The method of claim 21 wherein said alkoxy group of said first phenyl group is methoxy; said first and second substituents of said amino group of said second phenyl group are Y; and said hydroxyl of alkoxy substituent of said second phenyl group is methoxy.

27. The method of claim 26 wherein said solution is adjusted to a pH of 3 or less and heated to a temperature of between 170° C. to 200° C. under atmospheric pressure for 30 minutes.

28. The method of claim 27 wherein each Y is the product of reacting at least one glycidol monomer unit into said poly(oxyalkylene) chain followed by reacting at least four ethylene oxide monomer units into said poly(oxyalkylene) chain.

29. The method of claim 27 wherein each Y is the product of first reacting at least one glycidol monomer unit into said poly(oxyalkylene) chain, followed by reacting at least one propylene oxide unit into said poly(oxyalkylene) chain, which is followed by reacting at least four ethylene oxide monomer units into said poly(oxyalkylene) chain.

* * * * *